# 2,762,827

BIS-HEPTAMETHYLCYCLOTETRA-SILOXANYLETHANE

Oscar K. Johannson, Midland, Mich., assignor to Dow Corning Corporation, Midland, Mich., a corporation of Michigan No Drawing. Application October 9, 1953, Serial No. 385,269

1 Claim. (Cl. 260—448.2)

This invention relates to bis-heptamethylcyclotetrasiloxanylethane which has the formula

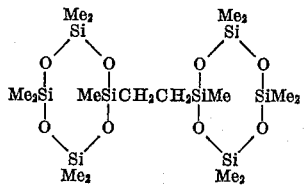

The compound of this invention is unique in the polysiloxane field in that it is composed of two cyclic methyl polysiloxanes which are linked by an ethylene radical. The two methyl polysiloxane rings can be opened up and polymerized in the normal manner with reagents such as alkali metal hydroxides or mineral acids. Furthermore, this material can be copolymerized (by the rearrangement of the siloxane linkages) with cyclic, hydrocarbonyl substituted siloxanes such as the cyclic polymers of dimethyl siloxane, diphenyl siloxane, phenylmethyl siloxane, vinylphenyl siloxane, ethylmethyl siloxane, diethyl siloxane and any other alkyl, aryl, and alkenyl substituted siloxanes.

The copolymers which are obtained by copolymerizing the material of this invention with other siloxanes are resilient gels which may be compounded with fillers and vulcanized to siloxane elastomers in the normal manner for the preparation of such elastomers.

The primary utility of the compound of this invention is that it makes possible the control of the number and distribution of cross links in a siloxane polymer. The number and distribution of cross links per molecule can be controlled merely by the amount of the compound of this invention which is added to the siloxane polymer. Such cross linked polymers can be used to prepare siloxane elastomers and they may be used as release agents for organic plastics.

The following example is exemplary of the best method for the preparation of the compound of this invention. However, other methods may be employed if desired.

Example 1

1,000 cc. of octamethylcyclotetrasiloxane was heated at 150° C. with stirring during the dropwise addition of a solution of 50 g. of t-butylperbenzoate in 147 g. of octamethylcyclotetrasiloxane. The addition was complete at the end of two hours. The mixture was washed with water until neutral and then distilled. During the distillation a fraction boiling from 101 to 161° C. at a pressure at from .5 to 1 mm. was obtained. A crystalline material separated from this fraction, which after recrystallization from methanol, was found to have a melting point of from 55 to 57° C. and a boiling point of 97° C. at 1 mm. This material was proven by analysis to be bis-heptamethylcyclotetrasiloxanylethane. It was found that the carbon content was 32.7% while the silicon content was 38.3%. This gives a carbon to silicon ratio of 1.996 as against the calculated ratio of 2. The molecular weight of the compound was found to be 641.

The structure of the material was further identified by copolymerizing .49 g. of it with 36.7 g. of octamethylcyclotetrasiloxane. The copolymerization was carried out by heating the mixture at 150° C. in the presence of a catalytic amount of potassium hydroxide. A rubbery insoluble gel was obtained.

Under identical polymerization conditions, the octamethylcyclotetrasiloxane gives a soluble dough-like polymer.

That which is claimed is:
Bis-heptamethylcyclotetrasiloxanylethane.

No references cited.